United States Patent [19]

Sanders

[11] B 4,001,385
[45] Jan. 4, 1977

[54] SULFUR RECOVERY SYSTEM

[75] Inventor: Frederick W. Sanders, Chillicothe, Ohio

[73] Assignee: The Mead Corporation, Dayton, Ohio

[22] Filed: June 21, 1974

[21] Appl. No.: 481,778

[44] Published under the second Trial Voluntary Protest Program on March 30, 1976 as document No. B 481,778.

Related U.S. Application Data

[63] Continuation of Ser. No. 230,525, Feb. 29, 1972, abandoned.

[52] U.S. Cl. .......................... 423/573 G; 252/445
[51] Int. Cl.² ........................................ C01B 17/04
[58] Field of Search ............ 423/573, 574, 576; 252/445, 447

[56] References Cited

UNITED STATES PATENTS

| | | | |
|---|---|---|---|
| 1,851,312 | 3/1932 | Huff | 423/574 |
| 1,941,623 | 1/1934 | Rosenstein | 423/574 X |
| 3,666,405 | 5/1972 | Winsel | 423/212 X |

OTHER PUBLICATIONS

Kirk–Othmer; *Encyclopedia of Chem. Tech.;* vol. 22; 2nd Ed.; Interscience Publishers, N.Y. 1970; pp. 141–144.

*Primary Examiner*—G. O. Peters
*Attorney, Agent, or Firm*—Biebel, French & Nauman

[57] ABSTRACT

Recovery of chemicals from a sodium sulfide containing pulping liquor which is cycled from a digester through a recovery system is effected by separating hydrogen sulfide gas, either from the cooking liquor or from various points in the recovery system, to provide a source of sulfide sulfur which is oxidized to sulfur. When separated from the cooking liquor, it is preferred that the hydrogen sulfide gas be taken from the black liquor, prior to combustion, so as to reduce the sulfidity of the liquor being burned and thereby to reduce sulfur losses in the combustion furnace and effect reduction of sulfur pollutants. Oxidation of the hydrogen sulfide gas is carried out in an aqueous medium, in the presence of a wetproofed catalyst and using air or other oxygen containing gas as the oxidant. Sour hydrocarbon gases containing hydrogen sulfide gas may also be processed in accordance with this invention to convert the sulfide sulfur to products such as elemental sulfur, sodium polysulfide and the like.

5 Claims, No Drawings

SULFUR RECOVERY SYSTEM

RELATED APPLICATIONS

This application is a continuation of application Ser. No. 230,525, filed Feb. 29, 1972, now abandoned. Reference is made to Ser. No. 87,504 now abandoned in favor of continuation application Ser. No. 468,471, filed May 9, 1974, and Ser. No. 87,503 now abandoned in favor of continuation-in-part application Ser. No. 356,569, filed May 2, 1973, which in turn has been abandoned in favor of continuation application Ser. No. 517,246, filed Oct. 23, 1974, both filed on Nov. 6, 1970, and assigned to the same assignee. Reference is also made to Ser. No 206,127, filed Dec. 8, 1971, now U.S. Pat. No. 3,927,111 and assigned to the same assignee.

BACKGROUND OF THE INVENTION

This invention relates to a system for the recovery of sulfur products and more particularly to an improved system for the production of sulfur in a form usable to produce sodium polysulfide in which sulfide sulfur in the form of hydrogen sulfide gas is taken from one or more sources, e.g., sour natural gas or the cyclic system of a digester recovery system and oxidized to a form of sulfur capable of producing sodium polysulfide or converted to another sulfur containing product.

DESCRIPTION OF THE PRIOR ART

A variety of basically different procedures are known in which hydrogen sulfide is oxidized. These include electrochemical operations, redox processes and catalytic processes.

U.S. Pat. No. 3,249,522 discloses the use of hydrogen sulfide gas as the fuel in an electrochemical fuel cell, the products being sulfur, sulfides, polysulfides, and the generated current. The fuel cell itself includes an anode and a cathode separated by an ion exchange membrane, the anode being carbon catalyzed with platinum and the cathode being carbon catalyzed with nickel. Hydrogen sulfide is fed into the anode compartment and oxygen is introduced into the cathode compartment, the electrolyte being alkaline. The process involves oxidation of the hydrogen sulfide at the anode and reduction of oxygen at the cathode.

U.S. Pat. No. 3,409,520 described an electrochemical system for removal of hydrogen sulfide gas from a natural gas mixture, the system being electrolytic in nature. The electrolysis cell includes an anode spaced and separated from the cathode by a diffusion barrier. With an acid electrolyte, the anodic oxidation product is sulfur while hydrogen gas is formed at the cathode. When the electrolyte is basic, the anodic oxidation product is polysulfide with hydrogen gas formed at the cathode. This system requires the application of current from an external source.

The catalytic oxidation of hydrogen sulfide in an alkaline solution to produce sulfur is described in U.S. Pat. No. 3,471,254. The catalyst is a phthalocyanine complex which is soluble in aqueous sulfide and insoluble in sulfide-free aqueous solutions, the catalyst being recovered as a curd and recycled.

U.S. Pat. No. 2,135,897 describes the air oxidation of calcium hydrosulfide, i.e., the reaction product of lime or calcium hydroxide and hydrogen sulfide, using a nickel sulfide catalyst which produces polysulfide, thiosulfate and sulfate in the ratio of 74:73:17. To increase the amount of polysulfide, 0.1% to 1.0% of hydrogen sulfide gas is admixed with the air oxidant to provide an excess of hydrogen sulfide in the oxidation stage.

U.S. Pat. No. 3,423,180 to Hoekstra discloses a process for oxidizing a sulfide compound to elemental sulfur, sulfite, thiosulfate, sulfate, or dithionate by contacting the sulfide solution with oxygen in the presence of a solid catalyst and a sulfur solvent. The catalyst may be a metallic sulfide or a metal phthalocyanine on a suitable carrier material. A further Hoekstra U.S. Pat. No. 3,457,046, teaches how polysulfide can be produced in such a system by controlling the amount of oxygen entering the oxidation zone.

U.S. Pats. Nos. 1,941,623 and 1,984,971 as well as British patent No. 282,508 deal with the oxidation of $H_2S$ in the presence of a catalyst and water in the form of a spray, fog or high humidity atmosphere.

In the field of catalysis, it is known that certain finely divided materials increase the rate of reaction. For example, finely divided nickel and cobalt have been used as catalyst in the hydrogenation of vegetable oils. Improved results are said to have been obtained by the use of thin foils or flakes which remain more easily dispersed than do fine powders (see for example U.S. Pat. No. 1,083,930).

U.S. Pat. No. 1,146,363 describes the use of carbon in granular form as a catalytic or purifying agent, the carbon being in a column or percolator in which liquid is flowed through a bed of granular carbon.

U.S. Pat. No. 2,365,729 describes the oxidation of an acid solution of ferrous sulfate to ferric sulfate in which granular activated carbon containing absorbed oxygen or air is used as the catalyst. The carbon is suspended in the liquid, and the oxidant is bubbled through the suspension, or the oxidant is diffused through the liquid by a diffuser made of carbon, or the liquid and oxidant are concurrently passed through a packed tower or column.

Reference is also made to U.S. Pat. No. 3,666,405 of May 30, 1972, relating to reaction between two phases, one of which has a higher wettability with respect to a porous body. Preferably, the porous body has both large and small pores so that when the fluid phase with the lower wettability is introduced under a higher hydrostatic pressure than the fluid phase having the higher wettability, the smaller pores will be filled with the higher wettability fluid and the larger pores with the lower wettability fluid, thus forming a large interface between the two fluid phases. Alternatively, it is disclosed that the porous body may have a multiplicity of uniformly sized pores of two different wetting properties. It is stated that this may be achieved by constructing the porous body of a mixture of metal and resinous material or making the porous body of or coating the interior of the pores with various hydrophobic resinous material.

Canadian patent No. 700,933 of Dec. 29, 1964, describes a system for the electrolysis of sodium chloride brine in which the cathode is porous and supplied with oxygen gas to prevent formation or evolution of hydrogen. In one form, the cathode compartment contains a slurry of particulate solids which is agitated by the air stream or by mechanical agitation. The particulate material may be graphite and coated with a hydrophobic material such as tetrafluoroethylene.

Canadian patents Nos. 907,292 and 941,134 disclose the use of catalysts in a deuterium exchange process. In one form there may be used a solid metal catalyst on a support having a sealing coating of a water vapor-hydrogen gas permeable, substantially waterproof resin or polymer, such as silicones. In another form, the catalyst may be deposited on or embedded into a porous hydrophobic support material. The purpose of the hydrophobic material is to retard poisoning of the catalyst by liquid water.

Similarly, U.S. Pat. No. 2,722,504 to Fleck discloses a silicone coated catalyst for use in effecting various hydrocarbon conversion reactions such as isonerization, desulfurization, denitrogenation, hydrogenation, hydroforming, reforming hydrocracking, destructive hydrogenation and the like.

It is known, and the prior art has attempted in various ways to generate polysulfide from the various forms of sulfur available in the pulping and recovery cycle. For example, U.S. Pat. No. 3,210,235 treats a portion of the green liquor to produce hydrogen sulfide by a carbonation procedure, the hydrogen sulfide being thereafter stripped and converted, at a high temperature and in the presence of catalysts, to produce elemental sulfur a portion of which is added to the pulping liquor and a portion of which is converted to sulfur dioxide used in the oxidation of hydrogen sulfide.

U.S. Pat. No. 3,331,732 treats green liquor in a scrubber with flue gas, the resulting product is then treated in a stripper to produce hydrogen sulfide gas which is then processed in a Claus type reactor.

U.S. Pat. No. 3,560,329 treats black liquor, prior to combustion in a recovery furnace, with sodium bicarbonate to produce hydrogen sulfide gas which is then treated in a Claus reactor to produce elemental sulfur. By treating black liquor, the sulfidity thereof is said to be reduced, thus reducing the sulfidity of the liquor being burned in the recovery furnace, thereby reducing sulfur losses.

U.S. Pat. No. 3,525,666 reuses the sulfur content of black liquor to prepare white liquor for kraft processing by carbonating the black liquor to a pH below 11 using combustion gases containing at least 15% $CO_2$. Hydrogen sulfide gas is stripped and oxidized to sulfur using a Claus process reactor.

U.S. Pat. No. 3,554,858 treats black liquor to an acid pH to liberate hydrogen sulfide and to precipitate the organic material which is thereafter separated to produce a first mother liquor. A second mother liquor is obtained after the smelt is added to water, the two liquors being combined and recausticized to form a lime mud and an aqueous sodium hydroxide solution, hydrogen sulfide being added to the hydroxide solution to produce white liquor. Reference is also made to U.S. Pat. No. 3,594,125.

The system of the present invention, because of its simplicity and efficiency, achieves the objective of the prior art, but in a different manner, and offers a versatility not available in the prior art. particularly significant is the fact that the inventment for capital equipment, to achieve the same objective, is less while permitting reduction of air borne pollutants.

SUMMARY OF THE INVENTION

In accordance with the present invention, hydrogen sulfide gas available from various sources, e.g., sour natural gas or recovery cycle in pulp processing, at various places in the cycle, e.g., digester, blow tank, evaporator, recovery boiler or furnace, smelt dissolving tank, and the like, is used as a source of sulfide sulfur which may be oxidized by an improved procedure to provide sulfur in a form for producing sodium polysulfide, e.g., elemental sulfur, or other sulfur containing products. Hydrogen sulfide may also be provided by treatment of black liquor or green liquor, as described in the prior patents, supra, or as to be described below. Regardless of the source, hydrogen sulfide is the reductant. The oxidant is oxygen, air or a mixture of oxygen with other gases, and the oxidation-reduction reaction is carried out in the presence of a catalyst and an aqueous medium. The aqueous medium may be acid or neutral. It may contain the hydrogen sulfide reductant or the reductant can be introduced into the reaction zone as a mixture of gases with the oxidant.

The catalyst, which is relatively inert chemically with respect both to the oxidant and the reductant, is believed to function by conducting electrons from contacting reductant molecules or ions to contacting oxidant molecules or ions, thus expediting the transfer of electrons involved in the reaction. Unlike known electrochemical systems, e.g., electrolysis or fuel cells in which the anode and cathode are separated by barriers or membranes and wherein oxidation takes place on one electrode and reduction on the other, the system of the present invention involves contiguous reactions of oxidation and reduction at the catalyst which is an electronically conductive material, and the system does not require the use of membranes or barriers.

In accordance with this invention a gas phase and a liquid phase are brought into simultaneous contact with the catalyst material and into contact with each other. At this point in the process the gas phase includes the oxidant and may or may not include the reductant, i.e., the hydrogen sulfide gas. If not present in the gaseous phase, the hydrogen sulfide is present in the liquid phase. According to this invention, the catalyst material is positioned at the interface of the gas and liquid phases and maintained simultaneously in contact with both phases.

An important aspect of the present invention is preventing the solid catalyst material from being in exclusive contact with the liquid phase. Likewise the solid catalyst material must not be in exclusive contact with the gaseous phase. When used in describing this invention, the term "flooded" means that the catalyst material is in exclusive contact with either the gas or liquid phases. If the catalyst material of the present invention is flooded, the reaction between the oxidant and reductant stops for all practical purposes.

Considerations in catalysis and electrochemistry may be applicable in some degree to the new discoveries of this invention. For example, if the catalyst material of the present invention is considered an electrode, even though no lead wires are attached for supplying or removing electrical current, both oxidation and reduction take place at the same "electrode", i.e., one member acts as both an anode and a cathode and both the oxidation product and the reduction product are generated at the same "electrode" member. While such a member could be characterized as a "mixed potential electrode", the kinetics of the system of the present invention are not sufficiently defined or understood as to provide a complete explanation of the reaction mechanism. Similarly, in view of the solid nature of the conductive material, elements of heterogeneous catalysis would seem to be present since the effect of the present system is to increase the rate of reaction substantially above those in the absence of the solid electronically conductive material. Characterization by a term such as heterogreneous catalysis, likewise, does not provide a complete explanation or understanding of the reaction mechanism.

Regardless of whether the explanation of the reaction mechanism is based on catalysis, electrochemistry or some combination of disciplines, the following general rules are applicable to the present invention:

a. The oxidant and the reductant should be capable of forming an interface or boundary;

b. Flooding of the catalyst material should be avoided; and c. Both oxidant and reductant should be in contact with each other and the catalyst material.

The procedures and system of the present invention involve a basically new concept and mode of operation in preparation of chemical materials by a reduction-oxidation reaction from reactants containing chemical elements of the desired product but in a valence state different from that in the desired product. This new operation involves the controlled contact of a gas or mixture of gases and an aqueous liquid medium at an interface in the locus of a solid catalyst material. This controlled contact is in contradistinction to intermixing of the reactants as bubbles of gas in a liquid, as by a diffuser, and the reaction is carried out at that locus of contact between the gas phase, aqueous medium and solid catalyst material. For the purpose of simplication, the following term has been developed to identify the process and the essential elements thereof.

"Contacogen" (trademark of The Mead Corporation, assignee of the present invention) means the solid catalyst material which forms the locus of the interfacial contact for the gas and liquid phases and which should be simultaneously contacted by each of them to produce the desired reaction.

Of particular interest is the fact that the present system offers unique advantages in that sulfur, in a form which is easily converted to sodium polysulfide, can be readily and continuously produced at ambient conditions, although higher pressures, and higher temperatures below the decomposition temperature of the reactants or products may be used.

Accordingly, it is a primary object of the present invention to provide an improved system for the oxidation of hydrogen sulfide to sulfur, or other sulfur containing products.

Another object is the production of sulfur on a batch or continuous basis by a reaction in which the oxidant is a gas and the reductant is an aqueous solution containing sulfide sulfur, and wherein both the oxidant and reductant are brought into interfacial contact with each other and simultaneously into contact with a catalyst.

Another object is the production of sulfur by a reaction in which the oxidant and hydrogen sulfide are present in a gaseous phase, wherein the gaseous phase and aqueous medium are brought together into interfacial contact with each other and simultaneously into contact with a catalyst.

DETAILED DESCRIPTION OF THE INVENTION

The essential components of the system of the present invention are an oxidant, a reductant, an aqueous medium and a catalyst. The oxidant may be any gas which contains elemental oxygen, such as air, pure oxygen, or mixtures of oxygen and small amounts of chlorine and the like, although the amount of gases such as ozone should be limited if they attack or degrade the catalyst. The reductant is hydrogen sulfide which may be present either in the gas phase or dissolved in the aqueous medium which also constitutes an ionically conductive phase, although in accordance with this invention conductivity of this phase is not believed to be as significant a factor as it is in electrochemical fuel cell or electrolysis systems. The gas phase and reductant aqueous medium are also characterized by the formation of an interface or boundary when the two are brought into contact with each other.

The catalyst in accordance with the invention, is a solid which is essentially inert with respect to the oxidant, the reductant, aqueous medium and products in the sense that it is not chemically attacked or reactive therewith. A material having a high surface area to weight ratio is preferred because it furnishes greater interfacial contact.

To initiate and to control the reaction in accordance with the present invention, the gas phase and the aqueous medium are brought into contact with each other and with the catalyst and maintained in that relationship. Since the reaction zone involves a gas phase, a liquid phase and the catalyst, the catalyst must be in contact with the gas and wetted by the liquid but not flooded by either. Wetted, as used here, means that the contact angle between the catalyst and the liquid is low, e.g., less than about 90° and approaching zero. If the contact angle is high, e.g., greater than about 90° and approaching 180°, then the liquid will tend to draw away from the surface of the catalyst, and the surface of the catalyst is in effect in substantial contact only with the gas, that is, flooded by the gas. On the other hand, with the surface of the catalyst readily wetted by the liquid, that is, with a contact angle approaching zero between the catalyst surface and the liquid, the liquid will tend to cover the surface of the catalyst, and the surface of the catalyst is in effect in substantial contact only with the liquid, that is, flooded by liquid. One method of preventing flooding, by the liquid is by a treatment of the catalyst which is designated as "wetproofing". This adds to the catalyst a minor proportion of an inert substance not wetted by the liquid, that is, the contact angle between this inert additive and liquid is greater than about 90°.

Typical of the electronically conductive materials which may be used as a catalyst are carbon, activated carbon, platinized asbestos, nickel or carbon or activated carbon containing inclusions such as nickel, iron, cobalt, silver, platinum, palladium, manganese oxides (e.g. manganese dioxide), manganese sulfides, iron oxides and hydrated oxides, nickel oxide, nickel sulfide and cobalt sulfide or mixtures thereof. Of the above materials, carbon and activated carbon appear to provide optimum performance because of the relatively large surface-area-to-weight ratio and the simplicity with which inclusions of metals and compounds of metals may be introduced into the material, as well as the degree to which carbon may be finely divided. Moreover, this is a readily available material which may be obtained in a wide variety of particle sizes and surface areas. Carbons from different sources often result in different reaction rates. These variations are easily determined by simple procedures. Typical of the carbons usable in accordance with the present invention are carbon black, furnace black, channel black or carbons prepared by known procedures from various sources, for example, wood, corn cobs, beans, nut shells, bagasse, lignin, coals, tars, petroleum residues, bones, peat and other carbonaceous material. The particle size may vary from 9 millimicrons to relatively large size, e.g., 1 inch or more, and usually the carbon is supplied as a mixture of various particle sizes. The surface area of the carbonaceous material may vary from 3 square meters per gram to in excess of 950 square meters per gram, as characterized by gaseous absorption using the BET method.

The carbon may be arranged in various physical arrangements, e.g., a porous carbon plate or tube wetproofed to prevent flooding, or a mass of wetproofed carbon granules or powder which float on the surface of the reductant, or a mass of wetproofed carbon granules or powder packed within a reaction vessel.

Carbon may be wetproofed as follows:

Polytetrafluoroethylene (PTFE) in emulsion form is intermixed with particulate carbon in an amount of between 0.1% to 100% based on carbon solids. The mixture is heated to remove the vehicle and dispersing agent for the PTFE. Another wetproofing method involves treating particulate carbon in the ratio of 1 gram of linear polyethylene per 10 grams of carbon. The polyethylene is dissolved in the ratio of 1 gram of polyethylene per 100 grams of hot toluene and poured over the carbon. After treatment, the carbon is heated at approximately 105°C to evaporate the toluene. The particles are not uniformly repellent but most of them are sufficiently repellent to float from several hours to several days.

Using the procedure described above, particulate carbon may also be wetproofed with polystyrene, fluorocarbon resins, polyethylene emulsions, silicones, or other hydrophobic materials, by any suitable procedure that avoids complete encapsulation by hydrophobic materials impermeable to the reactants or products formed. Other materials which may be used are polychlorotrifluoroethylene, prepolymerized silicone oils, and high vacuum silicone grease, for example.

Using the procedure described above, any of the heretofore mentioned catalysts, particulate carbon being only an example, may be wetproofed with polystyrene, polytetrafluorethylene, polyethylene, silicones, polychlorotrifluoroethylene, prepolymerized silicone oils, high vacuum silicone grease, poly (chloro-p-xylylene), paraffin, paratoluene sulfonamide, polydichlorodifluourethylene, and octadecyl amine.

Another procedure includes subliming a chlorinated paraxylylene dimer in a vacuum chamber and depositing the vapors on materials such as particulate carbon and porous sintered nickel, thereby forming a poly(-chloro-p-xylylene), known as "parylene".

In the case of materials such as finely divided platinum in an asbestos matrix, wetproofing is accomplished by using a 1% solution of polyethylene in toluene, wetting the asbestos matrix with the solution, draining off excess liquid then drying in an oven to evaporate the toluene.

In another example, paraffin wax is used in an amount varying from ½ to 2 grams per 10 grams of particulate carbon. The paraffin is dissolved in a solvent such as hexane or toluene, the carbon introduced into the mixture, heated and the solvent thereafter evaporated. Cetyl alcohol may also be used and applied in the same way. Any one of paratoluene sulfonamide, polydichlorodifluoroethylene and octadecyl amine may also be used and applied by intermixing with the carbon and heating the mixture to cause the treating material to adhere to the carbon. Each of the above materials operates satisfactorily in the new system as indicated by the production of crystalline sulfur.

The rate and/or efficiency of the system of the present invention may be increased by use of inclusions and the like with the catalyst. For example inclusions of metals and compounds of metal in the particulate carbon appear to increase the rate of reaction over that which occurred using the same carbon without inclusions. The inclusions may be provided as described in the following:

Cobalt sulfate as dissolved in water in the ratio of 0.5 grams per 100 milliliters of water. Particulate carbon was added in an amount of 10 grams per 100 milliliters of solution. The resultant mixture was heated to boiling and then dried in an oven at 110°C. The solid material was then treated with sodium hydroxide to precipitate an insoluble cobalt material, the solids thereafter filtered and washed with 0.1 normal sodium hydroxide. The carbon was then soaked in sodium sulfide solution for 4 hours, filtered and washed with hot water three times and then dried again at 110°C.

Manganeous nitrate was dissolved in slightly acidic solution in the ratio of 0.5 grams per 100 milliliters of water acidified with 0.1 grams of nitric acid. The remaining treatment was the same as described in connection with cobalt sulfate.

The same procedure described immediately above was utilized except that the inclusion was derived from ferric sulfate dissolved in 0.1 normal sulfuric acid.

Nickel sulfate, silver nitrate, and chloroplatinic acid were individually used and processed to form inclusions as above described.

All such inclusions were observed to increase the rate of reaction over that attained without the inclusions. In the usual production of wood pulp, the liquor loop includes a digester, a blow tank, washer, evaporator, recovery boiler, smelt tank, causticizer, clarifier, and the sludge loop between the clarifier and the causticizer, e.g., filter, kiln, and slaker, although this arrangement may vary somewhat, as is known in the art. Hydrogen sulfide is available from the digester, blow tank, evaporator, recovery boiler and the smelt tank. Hydrogen sulfide gas may also be provided by any of the methods discussed in the prior art, supra.

One of the preferred forms of this invention is to remove sulfur from the black liquor, before the recovery boiler so as to provide less sulfur losses. For example, it is known that losses in the recovery boiler exist, at some fixed percentage of throughput, the exact percentage being fairly constant for each boiler. Thus, if the throughput is greater, the total sulfur loss is increased with the result that increased make-up chemical must be used to maintain a steady state condition, and there is an increased odor and pollution problem. The other advantage of reducing the amount of sulfur containing material going into the recovery boiler is to reduce the sulfidity of the smelt because at levels of 60% to 80% sulfidity, the problems of corrosion and smelt explosions increase.

In one form, "stack gas" containing $CO_2$ is used to convert an alkaline solution containing the various sulfur compounds to a carbonated state, i.e., sodium acid carbonate and sodium acid sulfide which may then be heated to yield sodium carbonate and hydrogen sulfide gas. The sodium carbonate may be fed to the causticizer while the hydrogen sulfide gas is oxidized in the presence of a catalyst. In those instances in which it is desired to recover elemental sulfur, the hydrogen sulfide gas is dissolved in an aqueous media at an acid pH and then oxidized in the presence of a catalyst to form elemental sulfur which is recovered. Such gas may be from sour natural gas, or from processing in the pulp and paper industry in which event it is preferred that such treatment be of the black liquor leaving the digester but prior to the recovery boiler.

Where black liquor is acidified to produce hydrogen sulfide gas, a substantial portion of this gas is released as the pH is reduced to four. The residue is sodium thiosulfate and some insoluble sulfur materials, and by reducing the pH further, e.g., to three, the thiosulfate is decomposed to elemental sulfur and sulfur dioxide. The elemental sulfur may be extracted from the other solids with a water insoluble solvent (xylene or tributyl phosphate) and added to white liquor or to the digester, if desired. The surfur may also be extracted by steam stripping. The sulfur dioxide may be recycled into the untreated black liquor by heating the residue after extraction of the elemental sulfur. The residue of the heating can be fed to the recovery boiler and thereafter the product is causticized.

The acidification of the black liquor may be carried out with acetic, or sulfuric acid, or $SO_3$ gas or sodium acid sulfate. In any event, it is desirable to maintain reducing conditions in the black liquor (absence of air or oxygen) so as to prevent the loss of sodium sulfide. By this procedure, 50% or more of the sulfur in black liquor is recoverable as hydrogn sulfide gas and elemental sulfur.

The second acidification step, that producing $SO_2$ and elemental sulfur also produced a vanilla like odor near the end of the stripping procedure. The $SO_2$ may be cycled back in the system, as noted, by absorption in an aqueous alkaline medium, and if desired, reduced in a furnace using methane, coal or wood waste and the like and maintaining a reducing atmosphere.

The oxidation of the sulfide sulfur at the catalyst may be accomplished in any one of several types of apparatus as disclosed in the applications noted above, as well as other forms of apparatus designed to make efficient use of the catalyst. It may also be carried out on a continuous basis, a batch basis or a continuous batch basis.

In handling $H_2S$ gas, various procedures may be used, i.e., either the gas may be dissolved in water or acid medium and then oxidized in the presence of a catalyst, or the oxidant gas, hydrogen sulfide gas and aqueous medium may be simultaneously brought into contact with the catalyst thereby simultaneously effecting both dissolution and oxidation.

In one form, a tower containing wetproofed catalyst had water circulated through the tower at the rate of between 80 to 85 ml/min. A total of 800 ml of water was recycled. Air was flowed in a countercurrent direction to the water at a rate of 200 ml/min while $H_2S$ flowed in the same direction as air at the rate of 20 ml/min. The unit was run for three hours at which time the 800 ml of water was extracted of the formed sulfur which was visible in the solution as colloidal sulfur. No attempt was made to extract the formed sulfur from the catalyst. Sulfur was identified in appreciable yield considering the length of time and temperature of the run (74°F to 81°F).

Where $H_2S$ is present in sour natural gas, it is preferred for safety reasons that the $H_2S$ be stripped from the natural gas if it is to be admixed with the gaseous oxidant such as air or oxygen before adsorption in the media. It is possible and well known in the art to use air or oxygen at a ratio below explosive limits, in which event reaction may not be complete. In this case, the first media may be cycled into a second reactor for completion of the oxidation reaction in the presence of a catalyst.

Another source of $H_2S$ is in water in certain areas of the United States. In these areas, the amount of $H_2S$ dissolved in what is considered drinkable water is sufficiently high to be detected by smell. By the present invention, $H_2S$ dissolved in such water is easily removed by oxidizing the sulfide sulfur to elemental sulfur in the presence of a catalyst using air as an oxidant. The formed elemental sulfur is then easily removed or trapped thus providing water, otherwise drinkable, which is free of objectionable odor due to the prior presence of hydrogen sulfide gas. A simple unit for accomplishing this is a tower or column packed with catalyst using downward flow of water and upward flow of air.

In the pulp and paper field, one of the principal advantages of the present invention is the ease of conversion of sulfur containing compound into a form usable in treatment of lignocellulose material. One of the additional advantages in the reduction of the sulfur containing compounds passing through the recovery boiler and the resultant loss in such sulfur by-products. Moreover, the smelt sulfidity is lower if this invention is used when compared to the same cycle without the use of this invention. This enables pulping at higher sulfidity, if desired, while keeping the smelt sulfidity within reasonable levels.

The present invention may also be used to remove hydrogen sulfide gas from sour natural gas, using the procedures heretofore described and offers the advantage of conversion of noxious gas into sulfur or a sulfur compound which may be used in other chemical processes, well known in the art, or further processed to recover the sulfur as noted herein.

While the methods herein described constitute preferred embodiments of the invention, it is to be understood that the invention is not limited to these precise methods, and that changes may be made therein without departing from the scope of the invention which is defined in the appended claims.

What is claimed is:

1. In the process of oxidizing hydrogen sulfide gas with an oxygen containing gas in the presence of an aqueous medium at a neutral or acid pH and a solid heterogenous catalyst to form elemental sulfur, the improvement comprising:

reacting said hydrogen sulfide gas and said oxygen containing gas in a reaction chamber filled with said aqueous medium and said solid heterogeneous catalyst in particulate form, said solid catalyst being carbon particles which are relatively free from chemical attack by the reactants and the reaction products, said carbon particles having surface portions in contact with a hydrophobic material selected from the group consisting of polystyrene, polytetrafluoroethylene, polyethylene, silicones, polychlorotrifluoroethylene, prepolymerized silicone oils, high vacuum silicone grease, poly (chloro-p-xylylene), paraffin, paratoluene sulfonamide, polydichlorodifluorethylene and octadecyl amine without being completely encapsulated by or encapsulating said hydrophobic material.

2. The process of claim 1 wherein said particulate carbon contains as an inclusion thereon a material selected from the group consisting of nickel, platinum, manganese oxides, manganese sulfides, iron oxides, hydrated iron oxides, nickel oxide, nickel sulfide, cobalt sulfide, and mixtures thereof.

3. The process of claim 2 wherein said particulate carbon is treated with between 0.1% and 100% polytetrafluoroethylene by weight of carbon.

4. The process of claim 1 wherein said hydrogen sulfide is produced from black liquor.

5. The process of claim 4 wherein said hydrogen sulfide is obtained by treating said black liquor with stack gas containing $CO_2$.

* * * * *